(12) United States Patent
Chen

(10) Patent No.: US 8,091,905 B2
(45) Date of Patent: Jan. 10, 2012

(54) MOTORCYCLE LOW-PROFILE POSITIONING CREEPER

(76) Inventor: Tung-Ming Chen, DongGuang Town (TW)

( * ) Notice: Subject to any disclaimer, the term of this patent is extended or adjusted under 35 U.S.C. 154(b) by 345 days.

(21) Appl. No.: 12/372,201

(22) Filed: Feb. 17, 2009

(65) Prior Publication Data

US 2009/0250898 A1 Oct. 8, 2009

(30) Foreign Application Priority Data

Apr. 3, 2008 (TW) .............................. 97205723 U

(51) Int. Cl.
- B62B 1/02 (2006.01)
- B62B 1/10 (2006.01)
- B62B 5/04 (2006.01)
- B65G 7/04 (2006.01)

(52) U.S. Cl. ................... 280/79.4; 280/47.23; 280/32.6; 414/426; 414/430

(58) Field of Classification Search ............... 280/47.23, 280/2, 79.11, 79.2, 79.4, 79.5, 32.6; 414/430, 414/426

See application file for complete search history.

(56) References Cited

U.S. PATENT DOCUMENTS

| | | | |
|---|---|---|---|
| 2,102,674 A * | 12/1937 | Brown | 414/430 |
| 2,246,882 A * | 6/1941 | Gentry | 414/426 |
| 2,277,787 A * | 3/1942 | Scott | 414/234 |
| 2,610,750 A * | 9/1952 | Hulbert | 414/430 |
| 2,969,245 A * | 1/1961 | Wilson | 280/641 |
| 3,582,103 A * | 6/1971 | Schoning | 280/79.4 |
| D296,597 S * | 7/1988 | Adams | D34/23 |
| 4,875,694 A * | 10/1989 | Hamrick | 280/32.6 |
| 5,609,461 A * | 3/1997 | Lichtenberg | 414/426 |
| 6,095,746 A * | 8/2000 | Bergin | 414/430 |
| 6,386,560 B2 * | 5/2002 | Calender | 280/47.34 |
| 6,988,586 B1 * | 1/2006 | Perez | 182/21 |
| 7,097,406 B1 * | 8/2006 | Gang | 414/429 |
| 7,278,647 B1 * | 10/2007 | Keenan et al. | 280/79.11 |
| 7,284,942 B1 * | 10/2007 | Allen | 414/430 |
| 7,543,830 B2 * | 6/2009 | Symiczek | 280/79.11 |
| 7,600,767 B2 * | 10/2009 | Lewis | 280/79.7 |
| 2003/0038439 A1* | 2/2003 | Novak et al. | 280/79.7 |
| 2007/0286714 A1* | 12/2007 | Frost | 414/592 |

* cited by examiner

Primary Examiner — John R Olszewski
(74) Attorney, Agent, or Firm — Morris Manning Martin LLP; Tim Tingkang Xia, Esq.

(57) ABSTRACT

A motorcycle low-profile positioning creeper allows a medium to large motorcycle to be easily mounted on the positioning creeper and easily moved to any desired position on a horizontal surface such as a showroom floor or storage area. The positioning creeper comprises a low slung H-frame body and four rotatable wheels. The low slung H-frame body is a plate and comprises four corners and four protrusions. The four protrusions protrude upward and outward respectively from the corners and are separated from adjacent longitudinal protrusions a distance greater than a motorcycle tire width. The four rotatable wheels are mounted respectively under the four protrusions.

2 Claims, 6 Drawing Sheets

MOTORCYCLE LOW-PROFILE POSITIONING CREEPER

FIELD OF THE INVENTION

The invention relates to a motorcycle low-profile positioning creeper that allows a motorcycle to be easily mounted on the positioning creeper and easily moved to any desired position on a horizontal surface.

BACKGROUND OF THE INVENTION

Motorcycles are important vehicles in daily life and can be roughly divided into two categories, light motorcycles and heavy motorcycles. Moving motorcycles is strenuous because motorcycles are heavy to people, especially large motorcycles.

In a heavy motorcycle shop or showroom, motorcycles must be moved and adjusted to a good position for exhibition. Large motorcycles are heavy and are not easy to move into a limited space so it must be lifted and moved with a jack or other large appliance. However, space in a heavy motorcycle shop or showroom is usually limited, and moving heavy motorcycles is inconvenient.

In addition, a person who has a car and a large motorcycle often parks the car and motorcycle in a garage. Most garages have a narrow driveway that is long enough to park a large motorcycle in front of the car. After the motorcycle is driven into the garage, the motorcycle needs to be turned around so it can be driven easily out of the garage. However, a large motorcycle is difficult to turn around because of limited space in the garage and the weight of the motorcycle.

SUMMARY OF THE INVENTION

The main objective of the present invention is to provide a motorcycle low-profile positioning creeper that allows a medium to large motorcycle to be easily mounted on the positioning creeper and easily moved to any desired position on a horizontal surface such as a showroom floor or storage area.

The motorcycle low-profile positioning creeper comprises a low slung H-frame body and four rotatable wheels. The low slung H-frame body is a plate and comprises four corners and four protrusions. The four corners are formed symmetrically. The four protrusions protrude upward and outward from the corners and are separated from adjacent protrusions by a distance greater than a motorcycle tire width. The four rotatable wheels are mounted respectively under the four protrusions.

DETAILED DESCRIPTION OF THE PRESENT INVENTION

Figure 1:
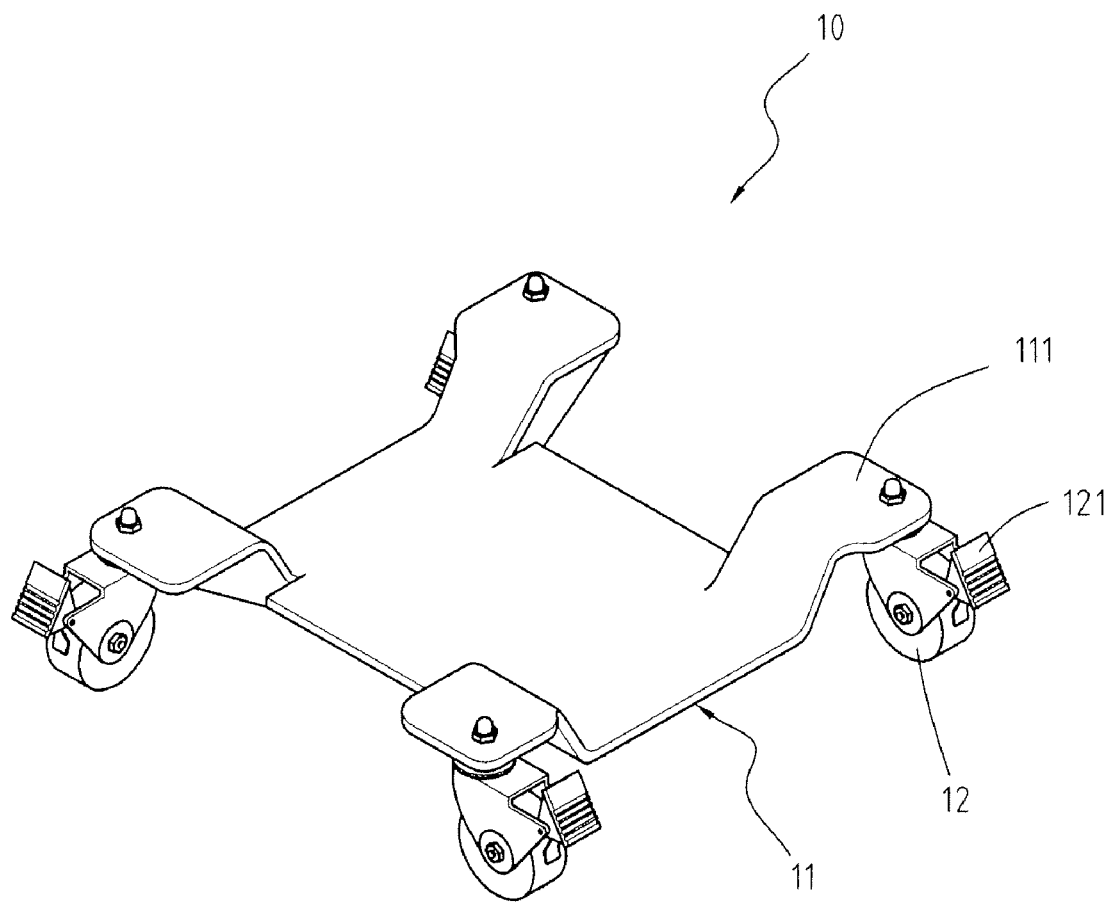
FIG. 1 is a perspective view of a center-stand kickstand creeper assembly in accordance with the present invention.
Figure 5:
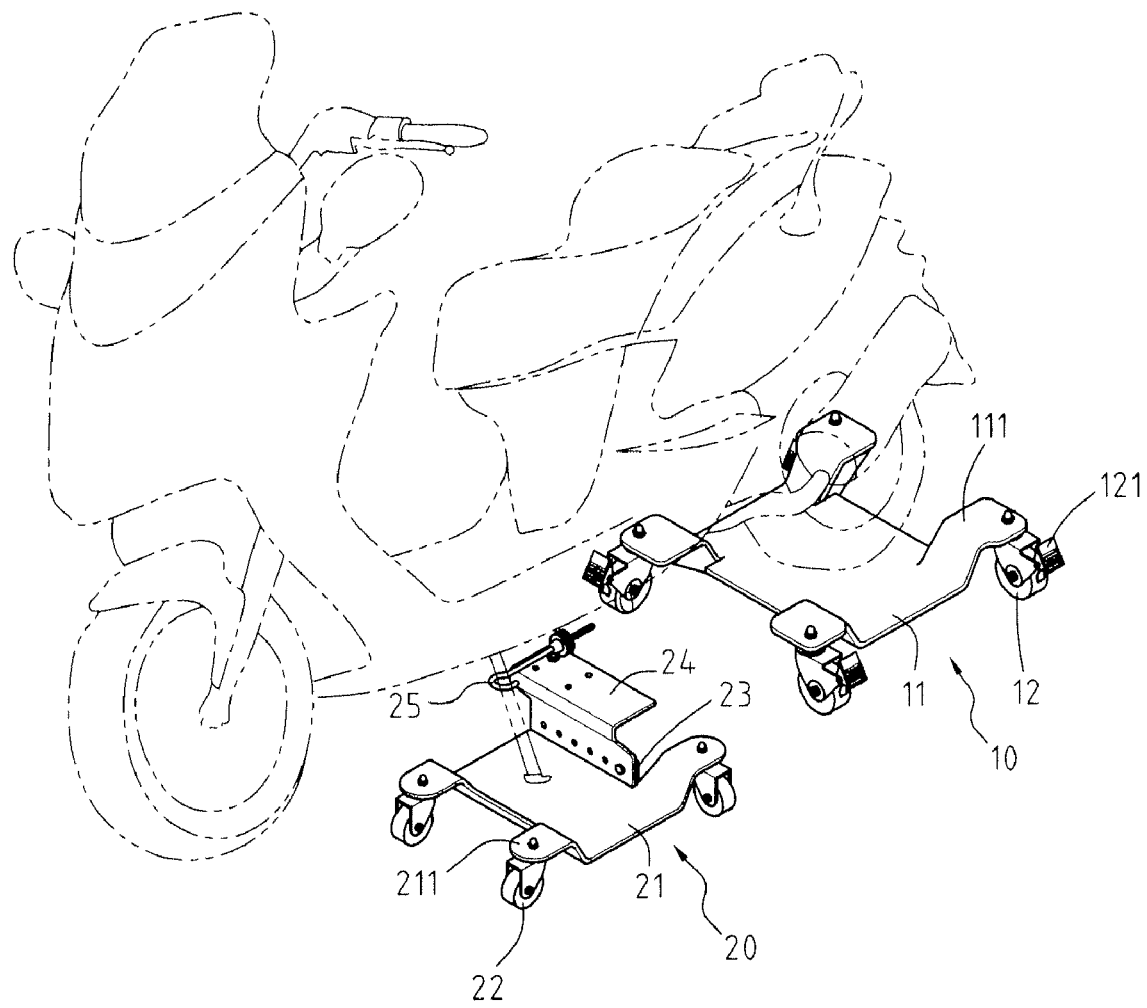
FIG. 5 is an operational perspective view of the center-stand kickstand creeper assembly and side kickstand creeper assembly in FIGS. 1 and 4.

With reference to FIGS. 1 and 5, a motorcycle low-profile positioning creeper in accordance with the present invention allows a motorcycle to be easily mounted on the positioning creeper and easily moved to any desired position on a horizontal surface and comprises a center-stand kickstand creeper assembly (10) and an optional side kickstand creeper assembly (20).

Figure 2:
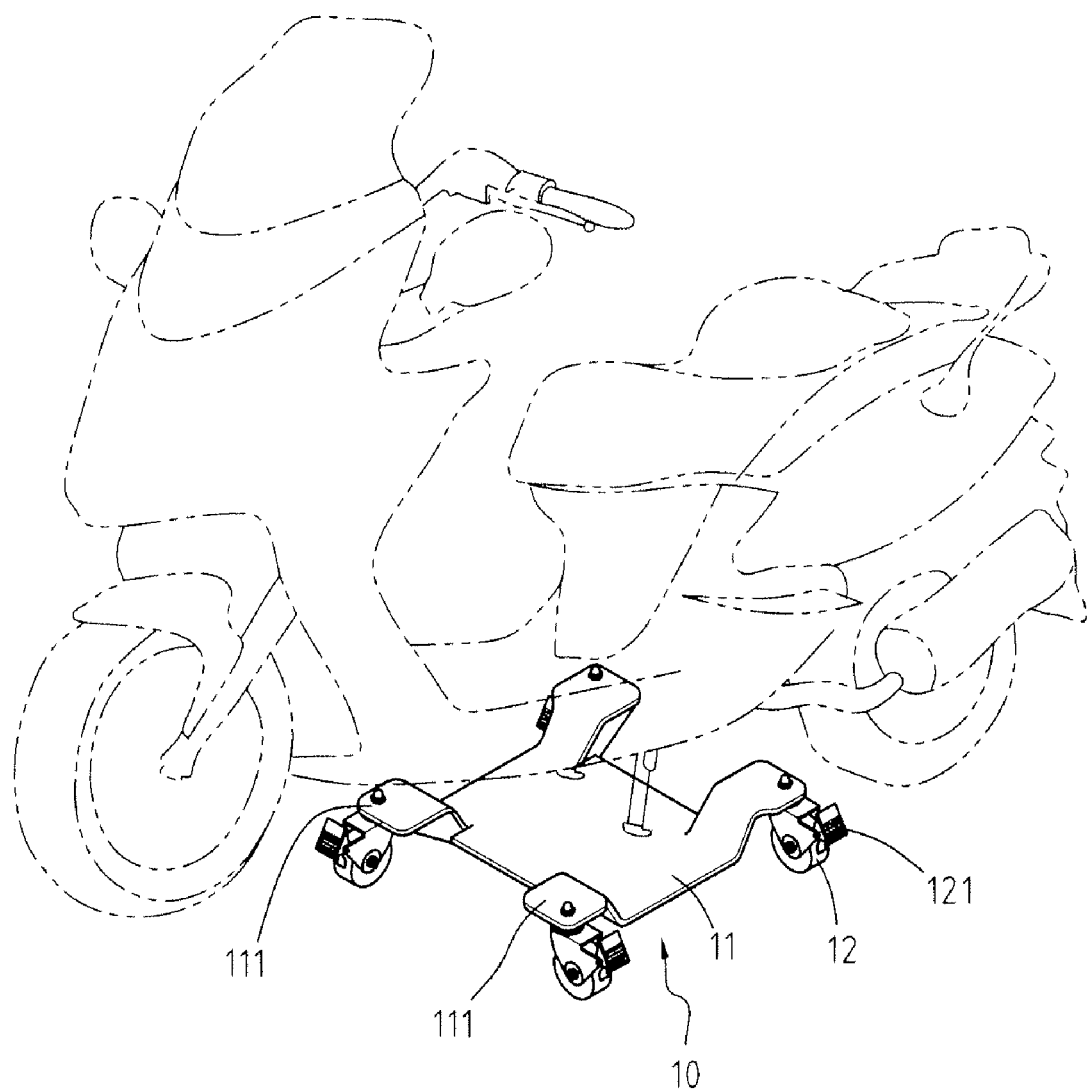
FIG. 2 is an operational perspective view of the center-stand kickstand creeper assembly in FIG. 1.

With further reference to FIG. 2, the center-stand kickstand creeper assembly (10) is mounted under a center-stand kickstand or a motorcycle's rear wheel to hold the motorcycle's rear wheel off the floor and comprises a low slung H-frame body (11) and four rotatable wheels (12).

The low slung H-frame body (11) is a plate and has four corners and four protrusions (111). The protrusions (111) are formed respectively on the corners, protrude up and longitudinally from the corners and are separated from adjacent longitudinal protrusions (111) by a distance greater than a motorcycle tire width so the tire can roll between adjacent protrusions (111) so a center-stand kickstand or a rear wheel can be positioned on the low slung H-frame body (11).

The four rotatable wheels (12) are mounted respectively under the four protrusions (111) so the motorcycle (20) can be easily moved to any desired position after the center-stand kickstand of the motorcycle is raised on the low slung H-frame body (11). Furthermore, each of the rotatable wheels (12) may have an optional wheel lock (121).

Figure 3:
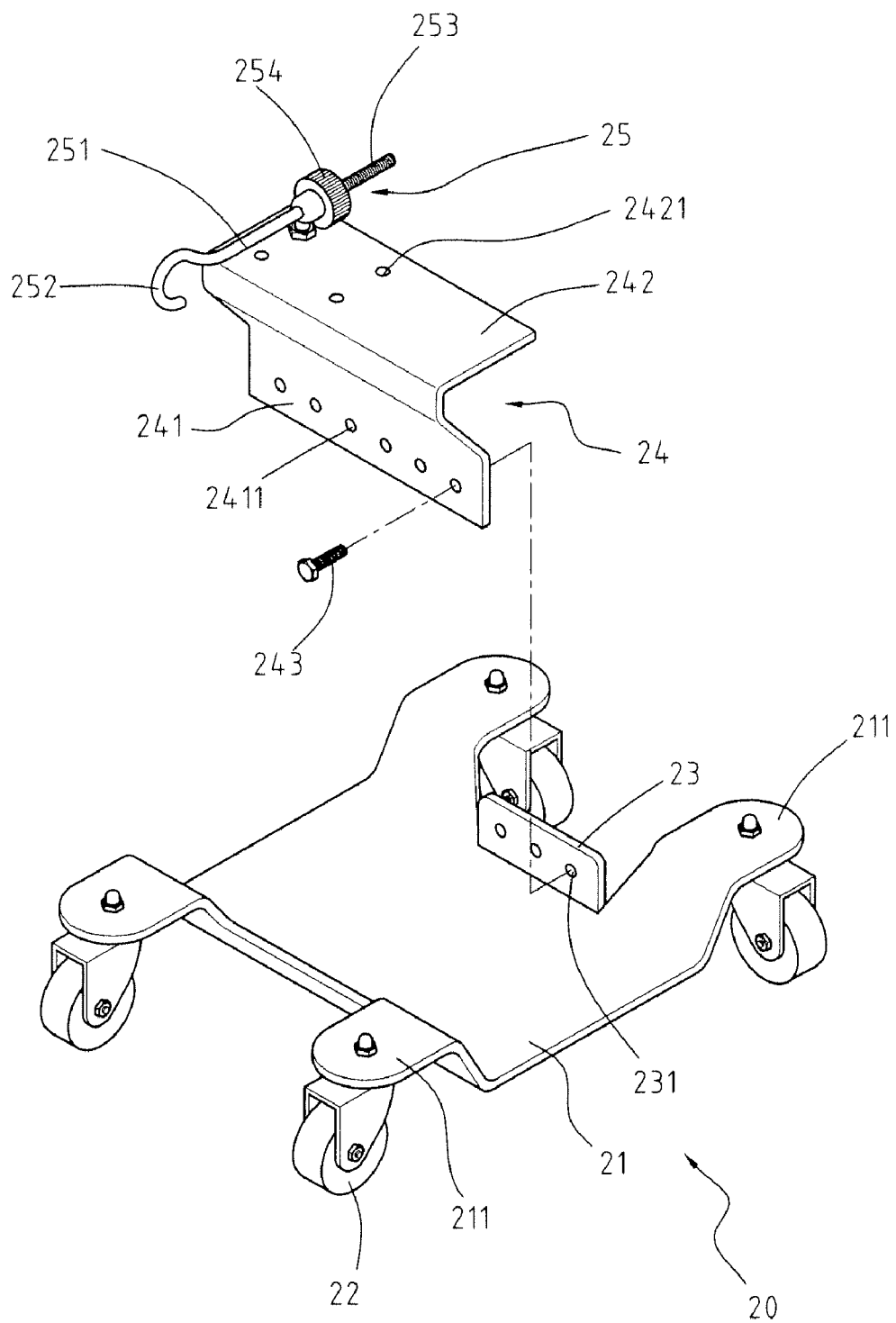
FIG. 3 is a partially exploded perspective view of a side kickstand creeper assembly in accordance with the present invention.
Figure 4:
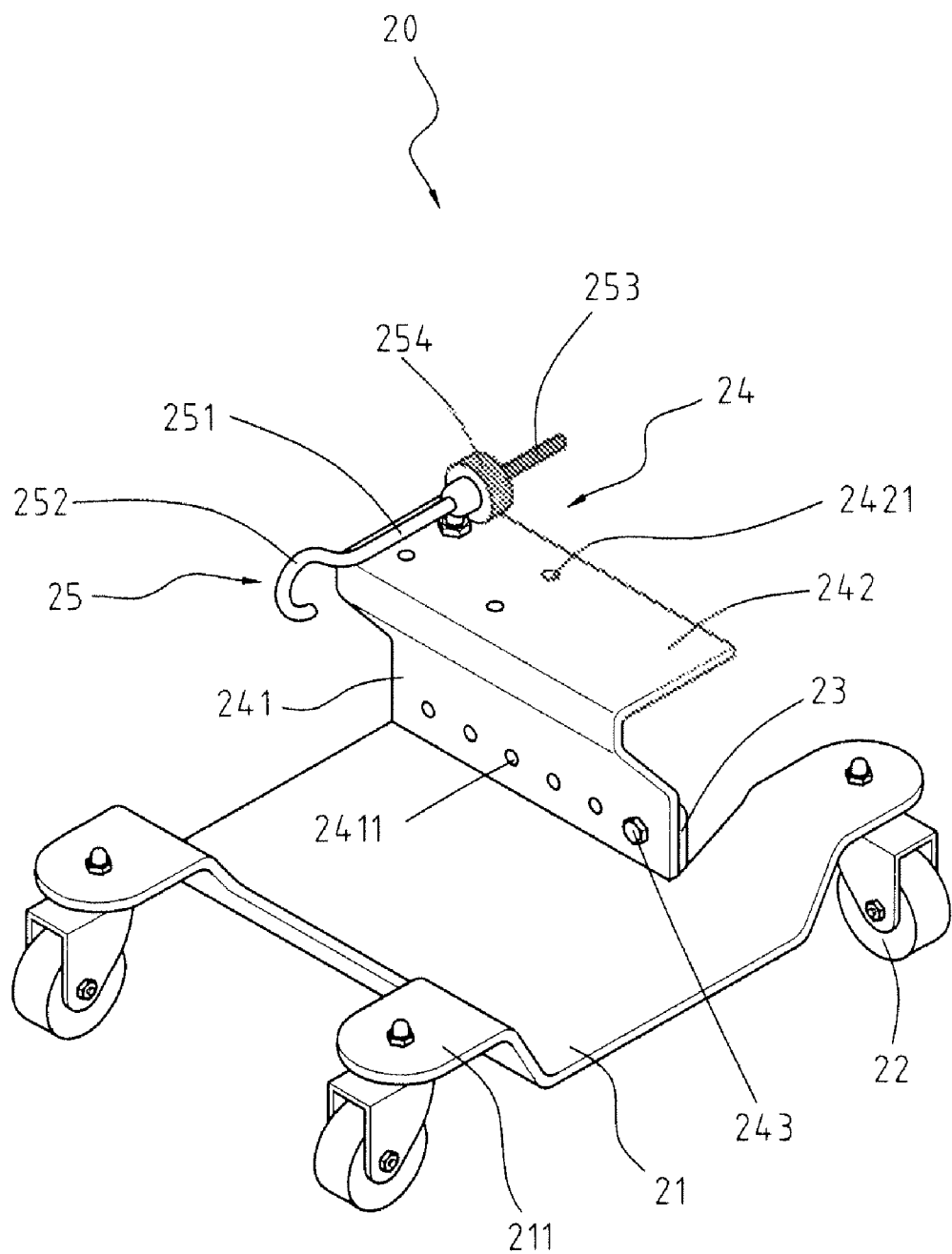
FIG. 4 is a perspective view of the side kickstand creeper assembly in FIG. 3.

With further reference to FIGS. 3, 4 and 5, the side kickstand creeper assembly (20) is mounted under a side kickstand when the center-stand kickstand creeper assembly (10) is mounted under the rear wheel so a very large motorcycle can be positioned on a showroom floor and comprises a kickstand seat (21), four rotatable wheels (22), an optional mounting lip (23), an optional kickstand brace (24) and an optional hook (25).

The kickstand seat (21) is a plate and has four corners, four protrusions (211) and a rear edge. The protrusions (211) are formed respectively on the corners and protrude up and longitudinally from the corners.

The four rotatable wheels (22) are mounted respectively under the four protrusions (211).

Figure 6:
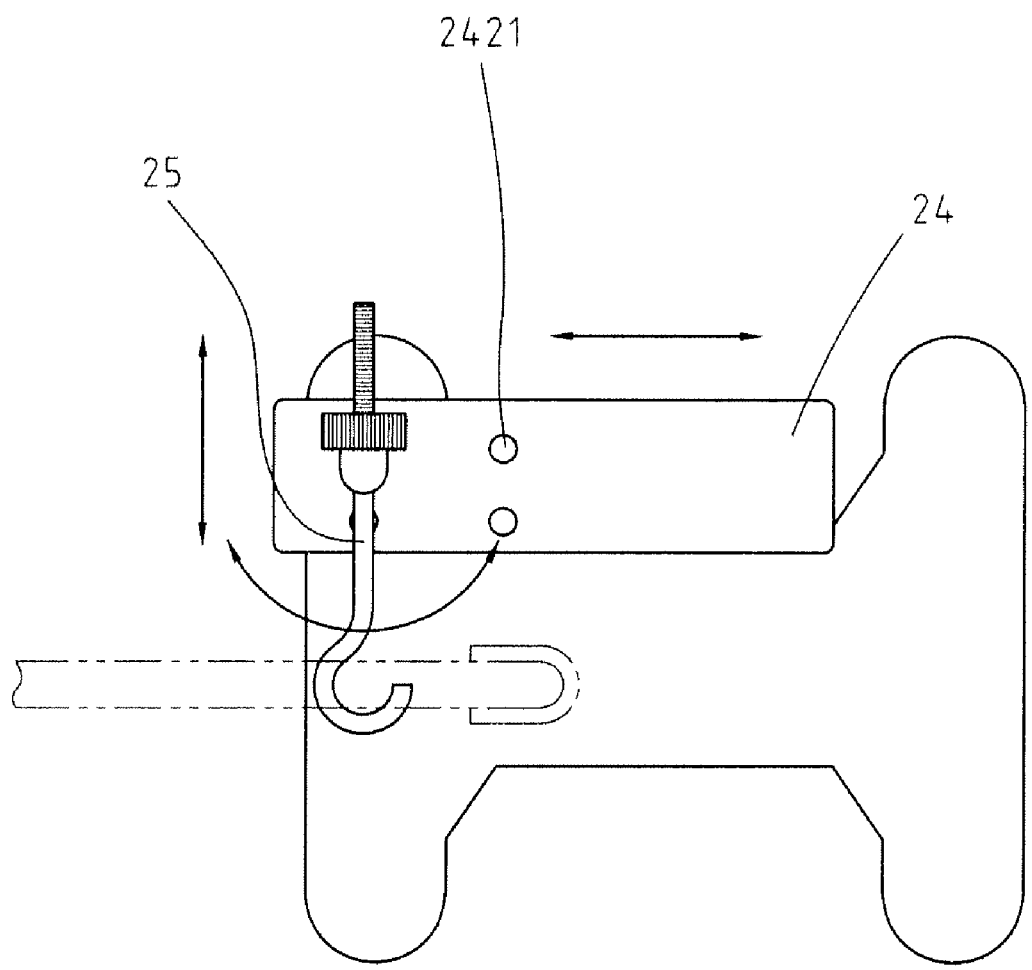
FIG. 6 is an operational top view of the side kickstand creeper assembly in FIG. 3.

With further reference to FIG. 6, the optional mounting lip (23) is formed transversely between adjacent longitudinal protrusions (211) and has multiple holes (231).

The optional kickstand brace (24) has an elongated leg (241) and a bracket (242). The elongated leg (241) has multiple anchor holes (2411) corresponding to the holes (231) in the mounting lip (23) and is mounted detachably on the mounting lip (23) by a bolt (243) inserted through one of the anchor holes (2411) and its corresponding hole (231). The bracket (242) is connected to the elongated leg (241) and has multiple through holes (2421).

The optional hook (25) is mounted through one of the through holes (2421) in the bracket (242) and has a shaft (251), a hooked head (252), a tail (253) and a knob (254). The shaft (251) is straight and has a front end and a rear end. The hooked head (252) extends from the front end of the shaft (251) to connect to and securely hold a side kickstand of the motorcycle. The tail (253) extends from the rear end of the shaft (251) and is threaded. The knob (254) is mounted movably on the tail (253) to hold the side kickstand securely against the bracket (242).

What is claimed is:

1. A motorcycle low-profile positioning creeper allowing a motorcycle to be easily mounted on the positioning creeper and easily moved to any desired position on a horizontal surface and comprising
- a center-stand kickstand creeper assembly being mounted under a center-stand kickstand or a motorcycle's rear wheel to hold the motorcycle's rear wheel off the floor and comprising
  - a low slung H-frame body being a first plate and having first four corners; and
    - first four protrusions being formed respectively on the first four corners, protrude up and longitudinally from the first four corners and being separated from adjacent longitudinal first protrusions by a distance greater than a motorcycle tire width; and
  - first four rotatable wheels being mounted respectively under the first four protrusions; and
- a side kickstand creeper assembly being mounted under a side kickstand when the center-stand kickstand creeper assembly is mounted under the rear wheel so a very large motorcycle can be positioned on a showroom floor and comprising
  - a kickstand seat being a second plate and having second four corners;
    - second four protrusions being formed respectively on the second four corners and protruding up and longitudinally from the second four corners; and
    - a rear edge;
  - second four rotatable wheels being mounted respectively under the second four protrusions;
  - a mounting lip being formed transversely between adjacent longitudinal second protrusions and having multiple holes;
  - a kickstand brace having
    - an elongated leg having multiple anchor holes corresponding to the holes in the mounting lip and being mounted detachably on the mounting lip by a bolt inserted through one of the anchor holes and its corresponding hole; and
    - a bracket being connected to the elongated leg and having multiple through holes; and
  - a hook being mounted through one of the through holes in the bracket and having a shaft being straight and having
    - a front end and a rear end;
    - a hooked head extending from the front end of the shaft to connect to and securely hold a side kickstand of the motorcycle;
    - a tail extending from the rear end of the shaft and being threaded; and
    - a knob being mounted movably on the tail to hold the side kickstand securely against the bracket.

2. The motorcycle low-profile positioning creeper as claimed as claim 1, wherein each of the rotatable wheels has a wheel lock.

* * * * *